(12) United States Patent
Spencer (10) Patent No.: US 11,421,792 B2
(45) Date of Patent: Aug. 23, 2022

(54) VALVE CONFIGURATION

(71) Applicant: SPM Oil & Gas Inc., Fort Worth, TX (US)

(72) Inventor: Gideon Nathanael Spencer, Westworth Village, TX (US)

(73) Assignee: SPM Oil & Gas Inc., Fort Worth, TX (US)

(*) Notice: Subject to any disclaimer, the term of this patent is extended or adjusted under 35 U.S.C. 154(b) by 0 days.

(21) Appl. No.: 16/977,433

(22) PCT Filed: Mar. 1, 2019

(86) PCT No.: PCT/US2019/020442
§ 371 (c)(1),
(2) Date: Sep. 1, 2020

(87) PCT Pub. No.: WO2019/169362
PCT Pub. Date: Sep. 6, 2019

(65) Prior Publication Data
US 2020/0400242 A1    Dec. 24, 2020

Related U.S. Application Data

(60) Provisional application No. 62/638,000, filed on Mar. 2, 2018.

(51) Int. Cl.
*F16K 15/06* (2006.01)
*F16K 1/38* (2006.01)
*F16K 1/42* (2006.01)

(52) U.S. Cl.
CPC ............ *F16K 15/063* (2013.01); *F16K 1/385* (2013.01); *F16K 15/06* (2013.01); *F16K 1/42* (2013.01)

(58) Field of Classification Search
CPC ........ F16K 15/063; F16K 15/06; F16K 1/385; F16K 1/42
See application file for complete search history.

(56) References Cited

U.S. PATENT DOCUMENTS

| | | | | |
|---|---|---|---|---|
| 2,103,503 A | * | 12/1937 | White | F04B 53/1027 137/329.04 |
| 2,745,631 A | * | 5/1956 | Shellman | F04B 53/1027 251/175 |
| 2,898,082 A | * | 8/1959 | Von Almen | F04B 53/1087 251/333 |

(Continued)

FOREIGN PATENT DOCUMENTS

WO    2017-004572 A2    1/2017

OTHER PUBLICATIONS

International Search Report and Written Opinion received in Patent Cooperation Treaty Application No. PCT/US2019/020442, dated May 6, 2019.

*Primary Examiner* — Patrick C Williams (57) ABSTRACT

A valve assembly for a high-pressure fluid pump is described herein. The valve assembly includes a valve seat disposed in a cylindrical bore in a fluid end of the pump, and a valve body that includes: a top plate defining at least one pressure window, a lower sealing surface disposed below the top plate, and a dampener disk disposed between the top plate and the lower sealing surface, the dampener disk configured to expand in response to pressure exerted thereon via the top plate and through the at least one pressure window.

13 Claims, 6 Drawing Sheets

(56) References Cited

U.S. PATENT DOCUMENTS

| | | | | |
|---|---|---|---|---|
| 3,057,372 | A | * | 10/1962 | Sutton ................ F04B 53/1087 137/516.29 |
| 3,548,868 | A | * | 12/1970 | Mullaney .............. F16K 15/026 137/515.5 |
| 4,408,632 | A | * | 10/1983 | Kent .................... F16K 15/063 137/516.29 |
| 5,226,445 | A | | 7/1993 | Surjaatmadja |
| 5,249,600 | A | * | 10/1993 | Blume ................ F04B 53/1087 137/516.29 |
| 7,334,603 | B2 | * | 2/2008 | Takeda ................ F16K 15/063 137/511 |
| 2013/0020521 | A1 | | 1/2013 | Byrne |

* cited by examiner

VALVE CONFIGURATION

RELATED APPLICATION

This application is a national phase application of Patent Cooperation Treaty Application No. PCT/US2019/020442 filed Mar. 1, 2019, which claims priority to U.S. Provisional Application No. 62/638,000 filed Mar. 2, 2018.

FIELD

The present disclosure relates to valves for high pressure fluid applications, and more particularly, to a novel valve configuration for hydraulic fracturing pumps.

BACKGROUND

Hydraulic fracturing, (a.k.a. "fracking") is a process to obtain hydrocarbons such as natural gas and petroleum by injecting a fracking fluid or slurry at high pressure into a wellbore to create cracks in deep rock formations. The hydraulic fracturing process employs a variety of different types of equipment at the site of the well, including one or more positive displacement pumps, slurry blender, fracturing fluid tanks, high-pressure flow iron (pipe or conduit), wellhead, valves, charge pumps, and trailers upon which some equipment are carried.

Positive displacement pumps are commonly used in oil fields for high pressure hydrocarbon recovery applications, such as injecting the fracking fluid down the wellbore. A positive displacement pump may include one or more plungers driven by a crankshaft to create a high or low pressure in a fluid chamber. A positive displacement pump typically has two sections, a power end and a fluid end. The power end includes a crankshaft powered by an engine that drives the plungers. The fluid end of the pump includes cylinders into which the plungers operate to draw fluid into the fluid chamber and then forcibly push out at a high pressure to a discharge manifold, which is in fluid communication with a well head.

DETAILED DESCRIPTION

The positive displacement pump commonly deployed at a frac site includes seals on its pony rods in the power end, or flow valves, suction valves, discharge valves, etc. in the fluid end. Such seals operate in harsh conditions, including high pressure (up to 15000 psi), continuous-duty (e.g., full rod load at 120 RPM), and in corrosive (e.g., up to 18% HCl) and high abrasive liquids. The valves must remain in service for a long life without leakage and other failure and be cost-effective to service and replace.

Figure 1:
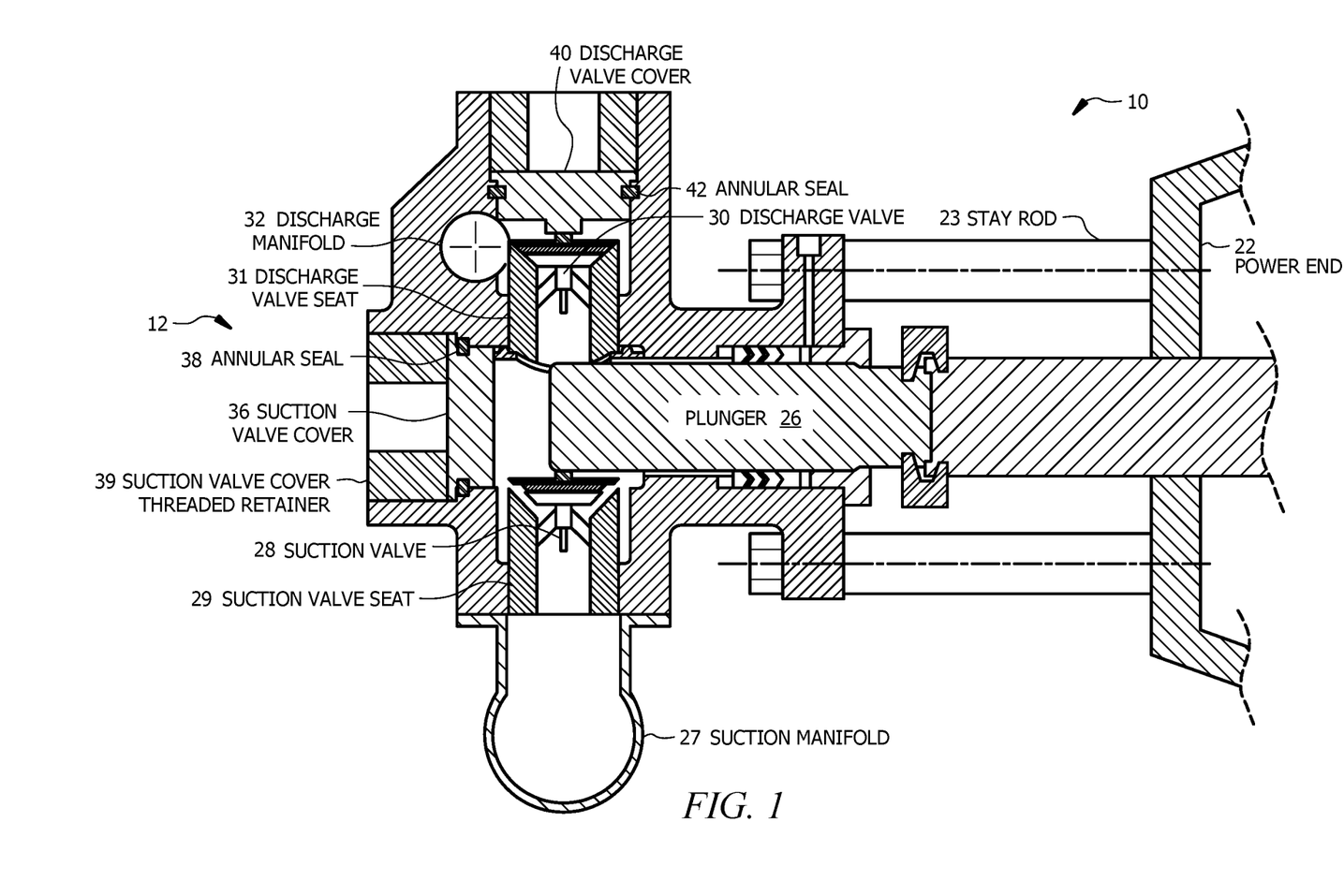
FIG. 1 is a cross-sectional view of an exemplary embodiment of a high-pressure hydraulic fracturing pump according to the teachings of the present disclosure.
Figure 2:
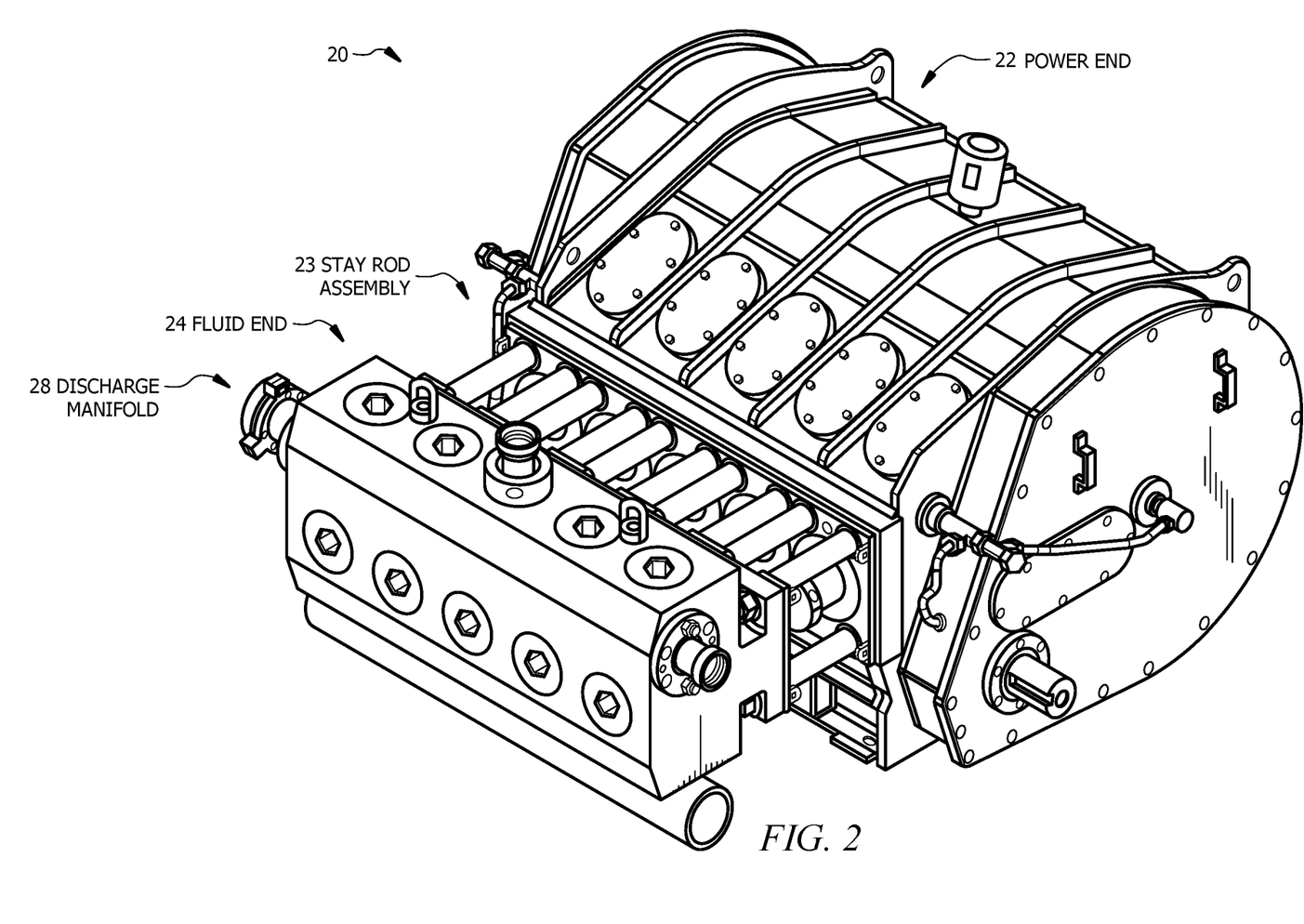
FIG. 2 is a perspective view of an exemplary embodiment of a high-pressure hydraulic fracturing pump according to the teachings of the present disclosure.

FIG. 1 is a partial cross-sectional view of a fluid end 10 of a positive displacement pump including an exemplary embodiment of a novel valve configuration according to the teachings of the present disclosure. FIG. 2 is a perspective view of an exemplary embodiment of a positive displacement pump 20. The positive displacement pump 20 has two sections, a power end 22 and a fluid end 24 connected by a stay rod assembly 23. The power end 22 includes a crankshaft powered by an engine and transmission that rotationally drive a crankshaft. A connecting rod, attached to the crankshaft at one end, converts rotational motion into linear motion and terminates at a wrist pin and a series of plungers 26. The plunger piston slides coaxially inside a fluid chamber, alternately increasing and decreasing chamber volume. The plungers 26 operate to draw fluid from a suction manifold 27 into the fluid chamber through an intake or suction valve 28 forming a sealing interface with a suction valve seat 29, and then discharge the fluid at a high pressure through a discharge valve 30 that forms a sealing interface with a discharge valve seat 31 to a discharge manifold 32. The discharged liquid is then injected at high pressure into an encased wellbore. The injected fracturing fluid is also commonly called a slurry, which is a mixture of water, proppants (silica sand or ceramic), and chemical additives. The novel valve concept described herein can be employed for a suction valve, a discharge valve, and any valve and seal present in the frac pump, as well as other types of equipment that may be present at an exemplary hydraulic fracturing site and elsewhere in other applications. An exemplary hydraulic fracturing site employs positive displacement pumps, a slurry blender, fracturing fluid tanks, high-pressure flow iron (pipe or conduit), trailers upon which some equipment are carried, valves, wellhead, charge pump (typically a centrifugal pump), conveyers, and other equipment at the site of a hydraulic fracturing operation or other types of hydrocarbon recovery operations.

Figure 3A:
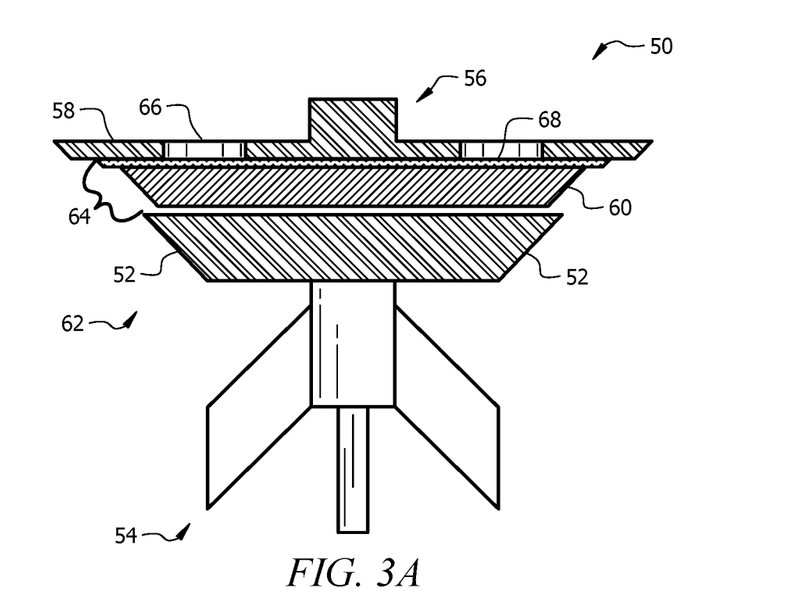
FIGS. 3A and 3B are cross-sectional side views of an exemplary embodiment of a novel valve in open and closed configurations according to the teachings of the present disclosure.
Figure 3B:
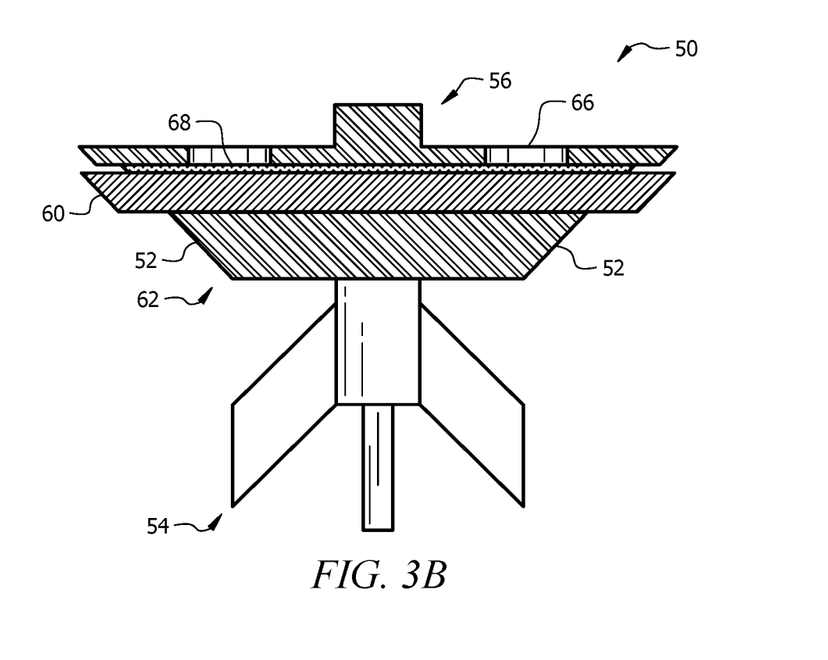
Figure 4A:
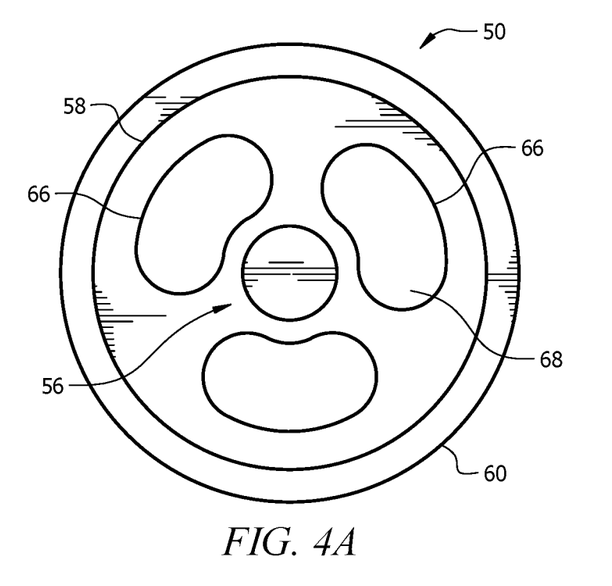
FIGS. 4A and 4B are top views of an exemplary embodiment of a novel valve in open and closed configurations according to the teachings of the present disclosure.
Figure 4B:
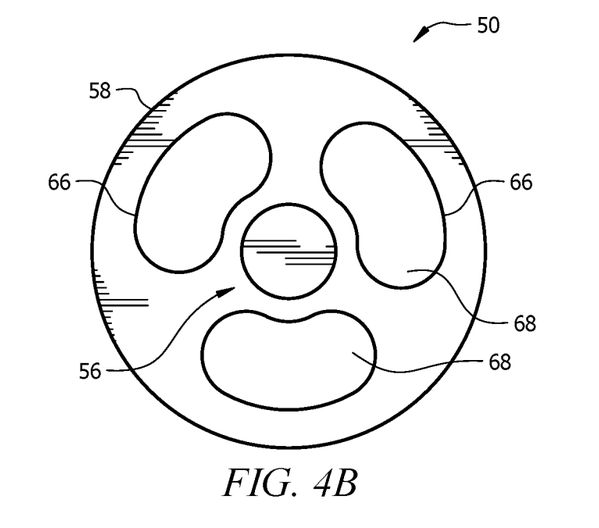

FIGS. 3A and 3B are cross-sectional side views and FIGS. 4A and 4B are top views of a valve body 50 operating in low pressure and high pressure conditions, respectively, according to an exemplary embodiment of the present disclosure. In FIG. 3A, the valve body 50 has a top portion that includes a sealing surface 52 configured and shaped to mate with a valve seat when installed. The bottom portion of the valve body 50 includes alignment members 54 that span the bore and are configured to slide along inside the bore wall to help constrain motion of the valve body 50 to a straight line in longitudinal alignment with the bore. A spring seat 56 is defined on a top plate 58 of the valve body 50 to hold a biasing member (e.g., a coiled spring) in place. The biasing member (not explicitly shown) provides a downward closing force on the valve body 50. The top plate 58, spring seat 56, and portion of the top portion of the valve body that defines the sealing surface 52 are preferably fabricated from a suitable metal now known or later to be developed.

Unlike conventional valves that typically includes a urethane ring in the sealing surface that is constantly exposed to the abrasive and corrosive fluid at high pressure, the embodiment shown in FIGS. 3A and 3B has a dampener disk 60 (fabricated from a material such as urethane, a polymer, or another suitable dampening material) sandwiched between the top plate 58 and a lower portion 62 of the valve body top portion. The top plate 58 further defines one or more pressure aperture windows 66 where the dampener disk 60 is exposed and uncovered by the top plate 58. The pressure windows 66 may be in any suitable shape, such as kidney, circular, elliptical, annular concentric with the top plate, etc. When subjected to lower pressures, the dampener disk 60 is generally withdrawn from the surface of the valve body 50. This arrangement leaves a gap 64 along the sealing surface of the valve body 50. When subjected to higher pressures, the downward force on the top plate 58 as well as the pressure exerted through the aperture windows 66 compress the dampener disk 60, thereby deforming it and compressing it to expand outward beyond the sealing surface of the valve body 50. The outward expanding dampener disk 60 along with the sealing surface 52 help to close the valve. An optional pressure plate 68, perhaps made of metal, floats between the dampener disk 60 and the top plate 58. With this arrangement, fluid above the valve body 50 may not directly contact the dampener material, but instead pushes down on the pressure plate 68 through the apertures of the pressure windows 66. The pressure plate 68 is thus forced to deflect downward on the dampener disk 60.

Figure 5A:
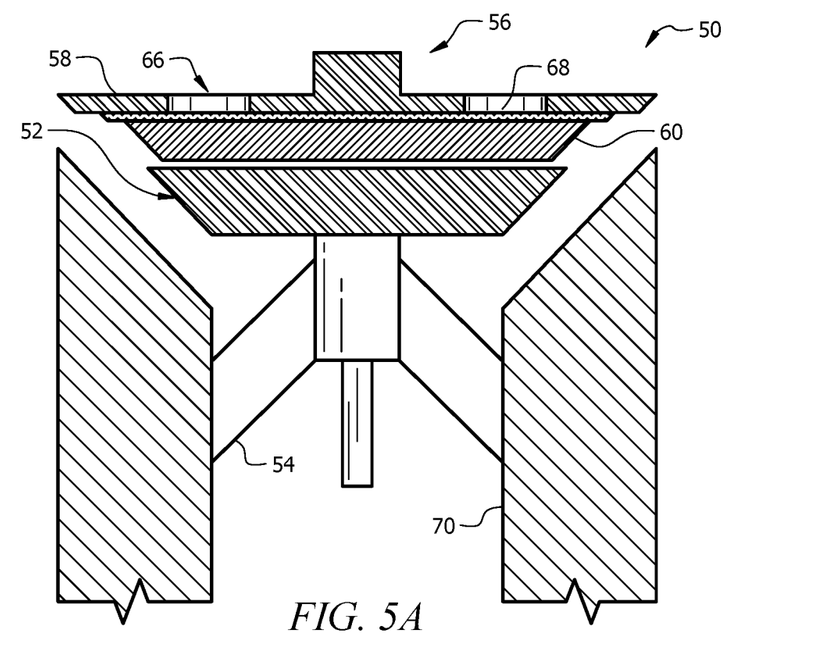
FIGS. 5A and 5B are cross-sectional side views of an exemplary embodiment of a novel valve assembly in open and closed configurations according to the teachings of the present disclosure.

FIG. 5A is a cross-sectional side view of an exemplary embodiment of the valve body seated in a valve seat 70 and operating in a low-pressure (open) condition. In this position, the top portion of the valve body 50 sits above the valve seat 70 and the sealing surface 52 of the valve body does not meet the valve seat 70. Therefore, fluid flows in the bore and bypasses the sealing surface of the valve and the valve seat. In this position, the dampener disk 60 is retracted, leaving a gap between the dampener material and high velocity fluid flow. This significantly reduces direct interface between the dampener material and the abrasive fluid, and thus minimizes erosion of the dampener disk. As a result, the dampener disk and thus the valve body last longer, extending the time period between valve replacements or other maintenance.

Figure 5B:
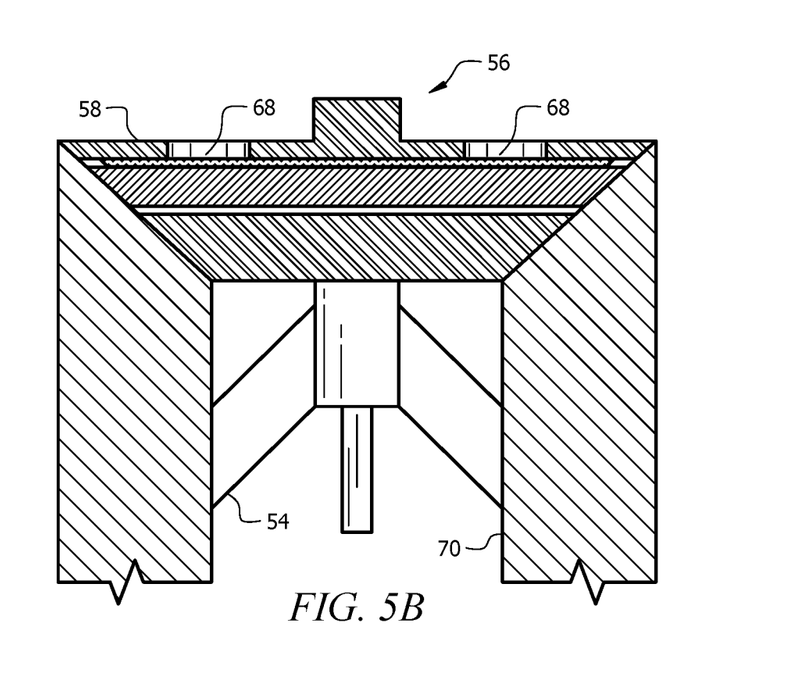

FIG. 5B is a side view of the valve body 50 operating in a high-pressure (closed) condition. With forces pushing downward on the top plate 58 of the valve body 50, the dampener disk 60 is compressed and bulges outward. The outward expanding dampener disk 60 meets the valve seat 70 and substantially fills any pre-existing gap. In this position, fluid flow through the bore is cut off by the closed valve.

Figure 6:
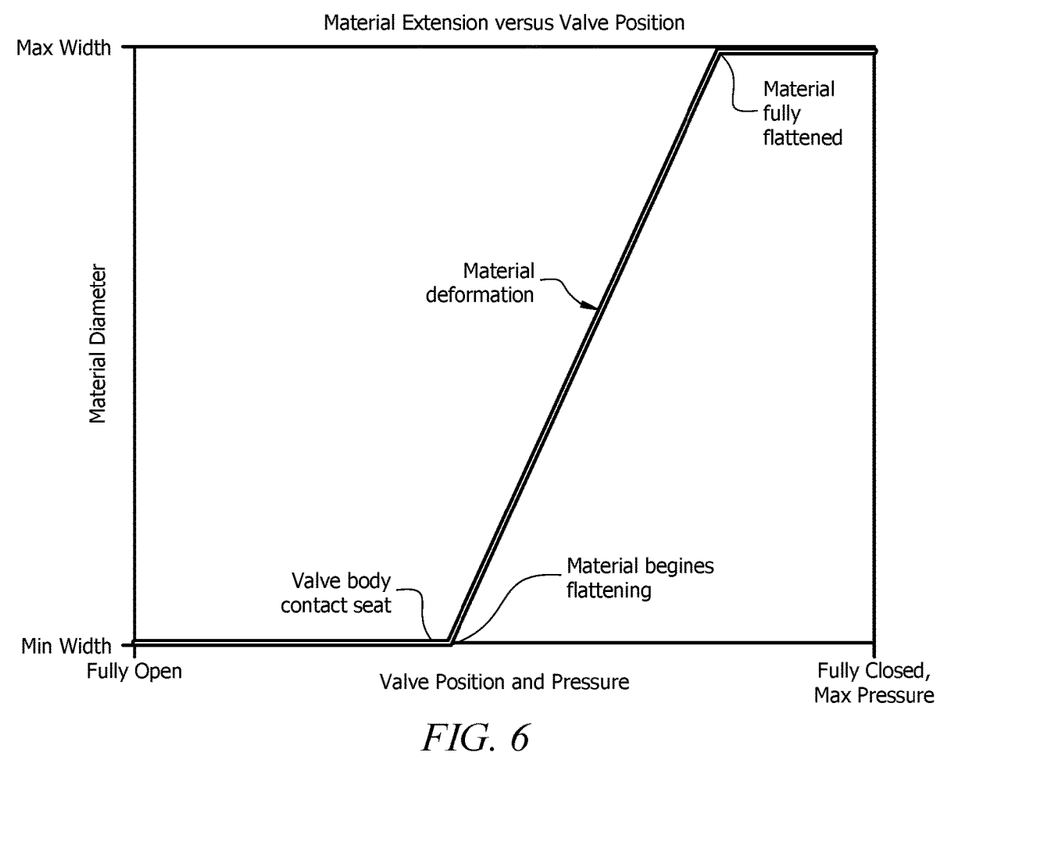
FIG. 6 is a graph of dampener disk expansion as a function of valve position for the exemplary embodiments described herein.

FIG. 6 is a graph of dampener disk expansion as a function of valve position for the exemplary embodiments described herein. The horizontal axis is the valve position/pressure and the vertical axis is the diameter of the dampener disk (or whatever other deformable material is used). As illustrated, when the valve is open, the dampener disk is in its undeformed shape, with a taller height and its minimum radius. As the valve closes, the metal portion of the valve body sealing surface contacts the valve seat. Then, as pressure builds, it impinges on the dampener disk (either directly or through a floating pressure plate), to deform it by compression. This increases the radius of the dampener disk. At some pressure level, the dampener disk expands against the valve seat, which halts its outward expansion even if the pressure continues to rise. The valve seat and the sealing surface of the valve body thus define the maximum radius of the dampener disk.

The features of the present invention which are believed to be novel are set forth below with particularity in the appended claims. However, modifications, variations, and changes to the exemplary embodiments described above will be apparent to those skilled in the art, and the novel valve configuration described herein thus encompasses such modifications, variations, and changes and are not limited to the specific embodiments described herein.

What is claimed is:

1. A valve assembly for a high-pressure fluid pump, the valve assembly comprising:
   a valve seat; and
   a valve body movable relative to the valve seat, the valve body comprising:
      a rigid top plate defining at least one pressure window;
      a lower sealing surface disposed below the top plate;
      a deformable disk disposed between the top plate and the lower sealing surface, the deformable disk configured to expand its radius in response to pressure exerted thereon via the top plate and through the at least one pressure window; and
      a pressure plate disposed between the top plate and the deformable disk and configured to translate pressure exerted through the at least one pressure window onto the deformable disk.

2. The valve assembly of claim 1, wherein the deformable disk is constructed from a dampener material selected from the group consisting of a urethane and a polymer.

3. The valve assembly of claim 1, wherein a lower portion of the valve body comprises alignment members configured to maintain proper alignment of the valve body in a bore.

4. The valve assembly of claim 1, wherein the top plate defines a spring seat.

5. A valve for a pump, comprising:
   a valve body configured to be movable relative to a valve seat, the valve body having a top plate defining at least one pressure window,
   a lower sealing surface disposed below the top plate,
   a deformable disk disposed between the top plate and the lower sealing surface, and
   a pressure plate disposed between the top plate and the deformable disk and configured to translate pressure exerted on the top plate and through the at least one pressure window onto the deformable disk.

6. The valve assembly of claim 5, wherein the deformable disk is constructed from a dampener material selected from the group consisting of a urethane and a polymer.

7. The valve assembly of claim 5, wherein a lower portion of the valve body comprises alignment members configured to maintain proper alignment of the valve body in a bore.

8. The valve assembly of claim 5, wherein the top plate defines a spring seat.

9. A valve assembly for a high-pressure fluid pump, the valve assembly comprising:
   a valve seat disposed in a cylindrical bore in a fluid end of the pump; and
   a valve body comprising:
      a top plate defining at least one pressure window;
      a lower sealing surface disposed below the top plate;
      a dampener disk disposed between the top plate and the lower sealing surface, the dampener disk configured to expand in response to pressure exerted thereon via the top plate and through the at least one pressure window; and
      a rigid pressure plate disposed between the top plate and the dampener disk and configured to convey pressure exerted onto the top plate and through the at least one pressure window onto the dampener disk.

10. The valve assembly of claim 9, wherein the dampener disk is constructed from a dampener material selected from the group consisting of a urethane and a polymer.

11. The valve assembly of claim 9, wherein a lower portion of the valve body comprises alignment members configured to maintain proper alignment of the valve body in a bore.

12. The valve assembly of claim 9, wherein the top plate defines a spring seat.

13. The valve assembly of claim 9, wherein the top plate defines at least one pressure window having a shape selected from the group consisting of kidney, circular, elliptical, and triangular.

* * * * *